US012789897B2

(12) United States Patent
de Castro Guimarães Lopes Barbosa

(10) Patent No.: US 12,789,897 B2
(45) Date of Patent: Nov. 10, 2026

(54) EXPANDING LENGTH VEHICLE CHASSIS

(71) Applicant: TUGA-GLOBAL, INC., Plymouth, MI (US)

(72) Inventor: Cesar Manuel de Castro Guimarães Lopes Barbosa, Sintra (PT)

(73) Assignee: TUGA-GLOBAL, INC., Plymouth, MI (US)

( * ) Notice: Subject to any disclaimer, the term of this patent is extended or adjusted under 35 U.S.C. 154(b) by 726 days.

(21) Appl. No.: 18/182,209

(22) Filed: Mar. 10, 2023

(65) Prior Publication Data

US 2023/0286586 A1 Sep. 14, 2023

Related U.S. Application Data

(60) Provisional application No. 63/319,057, filed on Mar. 11, 2022.

(51) Int. Cl.
*B62D 21/14* (2006.01)
*B62D 25/12* (2006.01)

(52) U.S. Cl.
CPC ............. *B62D 21/14* (2013.01); *B62D 25/12* (2013.01)

(58) Field of Classification Search
CPC ................................ B62D 21/14; B62D 25/12
See application file for complete search history.

(56) References Cited

U.S. PATENT DOCUMENTS 3,977,691 A * 8/1976 Robertson ............ B62D 53/067 280/404
4,574,902 A * 3/1986 Irimajiri ............... B62D 61/065 180/312
4,632,448 A * 12/1986 Yagasaki ................ B62K 5/027 296/132
5,401,056 A * 3/1995 Eastman .............. B62D 47/006 296/193.03
7,578,544 B1 * 8/2009 Shimamura ........ B62D 33/0273 296/26.11
7,581,780 B2 * 9/2009 Shimamura ........ B62D 33/0273 296/26.11
7,758,101 B2 * 7/2010 Schroder .................. B60J 7/145 296/108
8,353,534 B2 * 1/2013 Arnold ................. B60N 2/3013 280/808

(Continued)

FOREIGN PATENT DOCUMENTS

ES 2014759 A6 * 7/1990
GB 2556100 A * 5/2018 .............. B60P 3/423
WO WO-9323326 A1 * 11/1993 ................ B66F 9/10

OTHER PUBLICATIONS

Written Opinion of the International Searching Authority dated Jul. 18, 2023.

*Primary Examiner* — Jacob B Meyer
(74) *Attorney, Agent, or Firm* — Jacob M. Ward; Ward Law Office LLC

(57) ABSTRACT

A motorized vehicle having a chassis, a front portion disposed at a first end of the chassis, and a rear portion disposed at a second end of the chassis. The front portion is configured to be selectively moved relative to at least one of the rear portion and the chassis between a front closed position and a front opened position, and the rear portion is configured to be selectively moved relative to at least one of the front portion and the chassis between a rear closed position and a rear opened position.

18 Claims, 4 Drawing Sheets

(56) References Cited

U.S. PATENT DOCUMENTS

| | | | | |
|---|---|---|---|---|
| 8,376,441 | B2 * | 2/2013 | Nakamura | B62D 23/005 296/65.09 |
| 8,540,272 | B1 * | 9/2013 | Vitale | B62D 47/003 280/638 |
| 8,556,324 | B1 * | 10/2013 | Yamamoto | B60N 2/3065 296/65.09 |
| 8,690,217 | B2 * | 4/2014 | Yamamoto | B62D 47/003 296/65.09 |
| 8,727,426 | B2 * | 5/2014 | Vitale | B62D 21/14 296/193.04 |
| 8,752,878 | B2 * | 6/2014 | Yamamoto | B60N 2/3011 296/183.1 |
| 9,056,576 | B2 * | 6/2015 | Yamamoto | B60P 3/423 |
| 9,283,842 | B2 * | 3/2016 | Cerimeli | B60K 17/22 |
| 10,486,552 | B2 * | 11/2019 | Wakabayashi | B60H 1/16 |
| 11,745,819 | B2 * | 9/2023 | Schultz | B62D 37/00 180/216 |
| 12,060,108 | B2 * | 8/2024 | Chalifour | B62D 23/005 |
| 12,378,063 | B2 * | 8/2025 | de Castro Guimarães Lopes Barbosa | B64U 20/40 |
| 2011/0132678 | A1 * | 6/2011 | Nakamura | B62D 47/003 180/68.3 |
| 2012/0037441 | A1 * | 2/2012 | Frohnmayer | B62D 31/003 180/210 |
| 2012/0181765 | A1 * | 7/2012 | Hill | B62K 5/10 903/902 |
| 2014/0034409 | A1 * | 2/2014 | Nakamura | B62D 21/183 180/291 |
| 2015/0084321 | A1 * | 3/2015 | Hirooka | B60P 3/423 280/756 |
| 2018/0057097 | A1 * | 3/2018 | Frohnmayer | B62K 5/027 |
| 2019/0275834 | A1 * | 9/2019 | Budweil | B60B 35/1018 |
| 2021/0229770 | A1 * | 7/2021 | Schultz | B62J 1/14 |
| 2023/0286586 | A1 * | 9/2023 | de Castro Guimarães Lopes Barbosa | B62D 25/12 |
| 2024/0409174 | A1 * | 12/2024 | Kazemkhani | H01M 50/204 |

* cited by examiner

EXPANDING LENGTH VEHICLE CHASSIS

CROSS-REFERENCE TO RELATED APPLICATIONS

This application claims the benefit of U.S. Provisional Application Ser. No. 63/319,057, filed on Mar. 11, 2022. The entire disclosure of the above application is incorporated herein by reference.

FIELD

The present invention relates generally to a motorized vehicle and, more particularly, to a motorized vehicle configured for easy entry and exit of a driver and passenger.

INTRODUCTION

This section provides background information related to the present disclosure which is not necessarily prior art.

Due to the growing human population and increased use of fossil fuels, the ecosystem of the planet is being damaged. This damage may be mitigated by reducing energy use, especially in motorized vehicles.

The majority of motorized vehicles on the road often only carry one passenger. However, most motorized vehicles are designed to carry several passengers, often with seats available for upwards of four to eight people. This results in more energy being used than is required for transport of passengers. In addition, because most motorized vehicles are built to carry several passengers, a majority of motorized vehicles end up being typically larger and more expensive to manufacture than what is practical. Large motorized vehicles are more prone to becoming stuck in traffic because of their size and may be difficult to park. Large motorized vehicles may be expensive to make and operate, are often excessive in length and width, may lack safety and comfort, and may be cumbersome to enter and exit for both the driver and passenger(s). In addition, large motorized vehicles generally lack a strong value proposition.

To help solve these problems, attempts have been made to combine the practical attributes of a car and a motorcycle. A motorized vehicle designed to carry one to two passengers and cargo that is compact and has an aerodynamic body similar to that of a motorcycle is more efficient and will pollute less than a traditional motorized vehicle. However, prior attempts have failed to create an efficient, compact car that may be used commercially. More specifically, a motorized vehicle that is fully enclosed, narrow, and capable of being used safely and easily as a commercial passenger transport vehicle or taxi is not available. Desirably, such a motorized vehicle would have separate spaces for the driver and the passenger to allow for less physical contact and hence greater protection for the driver.

Accordingly, there is a continuing need for a motorized vehicle that is safe, efficient, compact, practical, modular, and fun. Desirably, the motorized vehicle would be easy and inexpensive to make and operate, convenient to get in and out of, easy to park, and capable of lane-sharing and lane-splitting to optimize traffic flow.

SUMMARY

In concordance with the instant disclosure, a motorized vehicle that efficient, compact, practical, modular, fun, easy and inexpensive to make and operate, convenient to get in and out of, easy to park, and capable of lane-sharing and lane-splitting, has surprisingly been discovered.

In certain embodiments, a motorized vehicle includes a chassis, a front portion disposed at a first end of the chassis, and a rear portion disposed at a second end of the chassis. The front portion may be configured to be selectively moved relative to at least one of the rear portion and the chassis, where the movement may be between a front closed position and a front opened position. The rear portion may be configured to be selectively moved relative to at least one of the front portion and the chassis, where the movement may be between a rear closed position and a rear opened position.

In certain embodiments, a motorized vehicle includes a chassis and a front portion disposed at a first end of the chassis. The front portion and the first end of the chassis may define a first cavity and the first cavity may have a driver seat. A rear portion may be disposed at a second end of the chassis. The rear portion and the second end of the chassis may define a second cavity. The second cavity may have a passenger seat. The front portion may be pivotably coupled to the first end of the chassis and may be configured to be selectively moved between a front closed position and a front opened position relative to at least one of the rear portion and the chassis. The rear portion may be slidingly engaged with the first end of the chassis and may be configured to be selectively moved between a rear closed position and a rear opened position relative to the first end of the chassis and the front portion using a sliding mechanism.

In certain embodiments, a method of using a providing a motorized vehicle includes a first step of providing a motorized vehicle having a chassis, a front portion disposed at a first end of the chassis, and a rear portion disposed at a second end of the chassis, wherein the front portion is configured to be selectively moved between a front closed position and a front opened position relative to at least one of the rear portion and the chassis, and wherein the rear portion is configured to be selectively moved between a rear closed position and a rear opened position relative to at least one of the front portion and the chassis. Additional steps may include configuring the motorized vehicle in one or both of the front opened position and the rear opened position, permitting the driver and the passenger to enter the motorized vehicle, configuring the motorized vehicle in one or both of the front closed position and the rear closed position, and operating the motorized vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
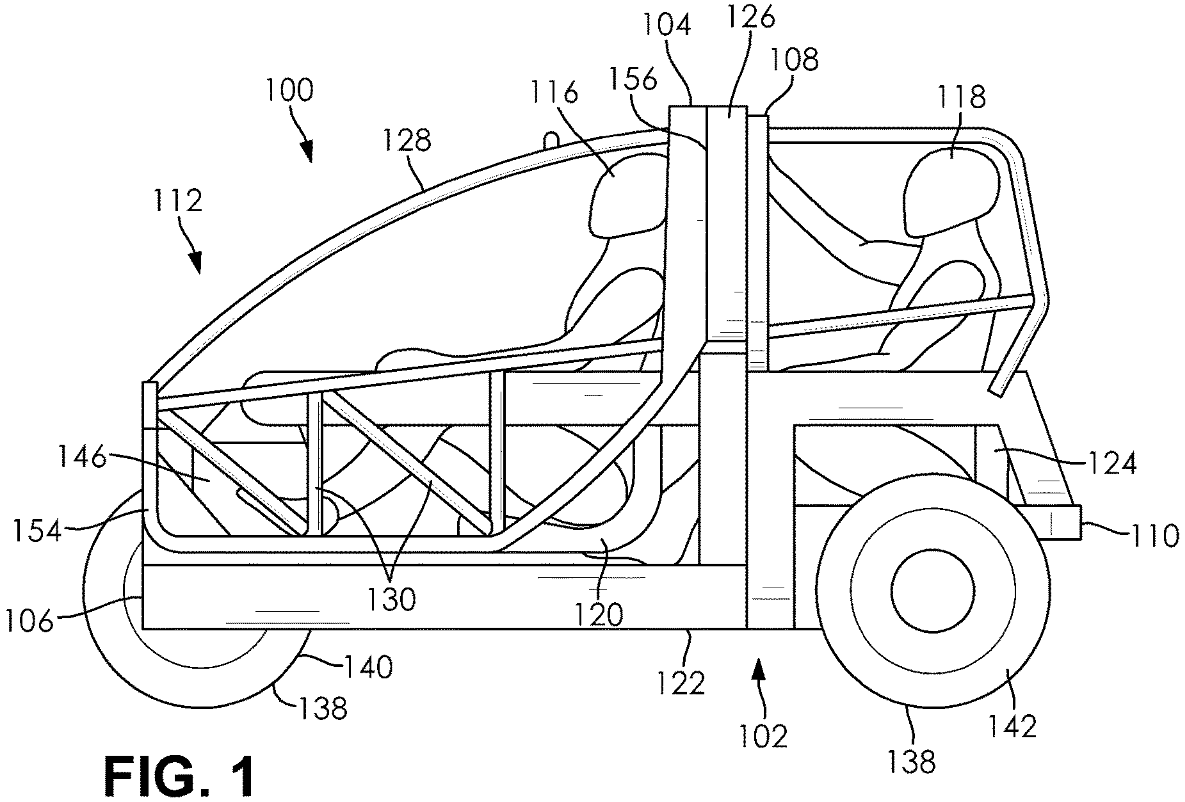
FIG. 1 is a side elevational view of a motorized vehicle according to one embodiment of the present disclosure.
Figure 2:
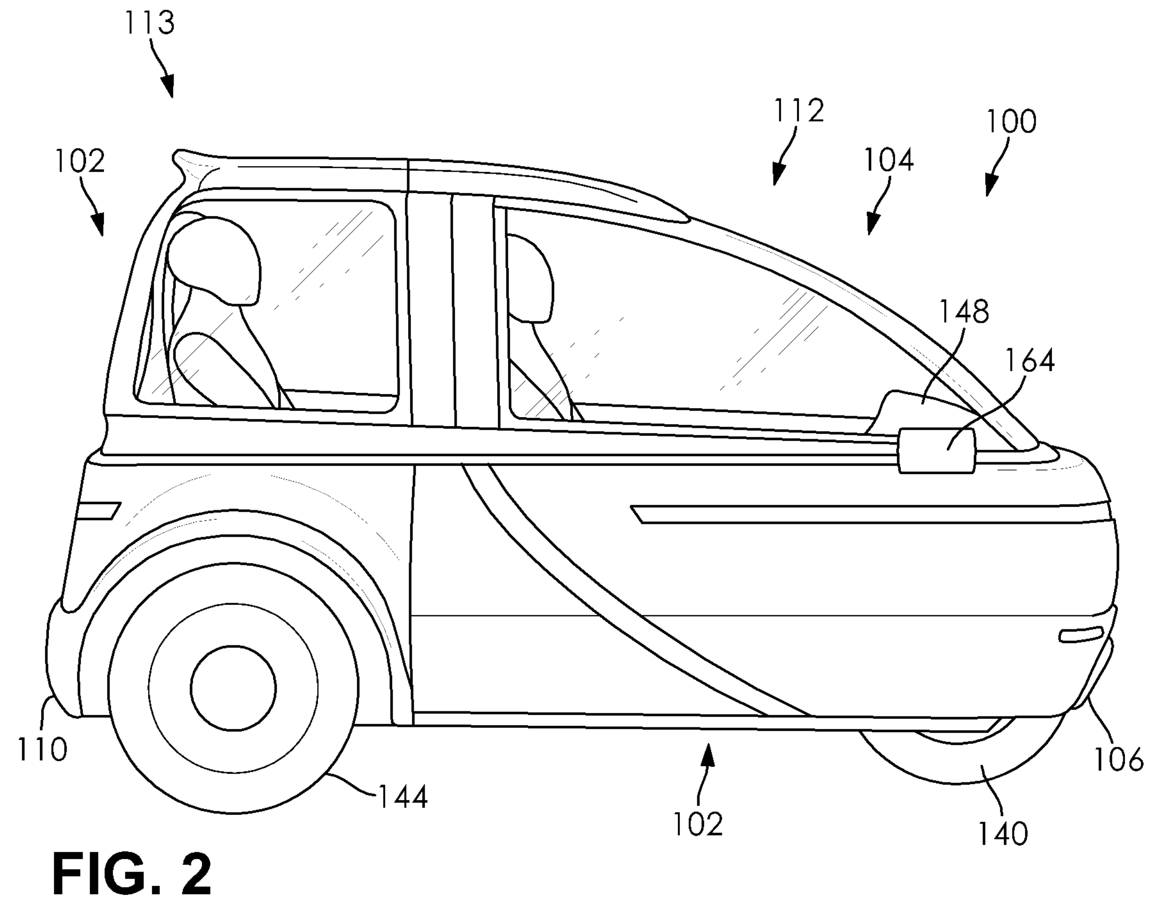
FIG. 2 is a side elevational view of a motorized vehicle according to another embodiment of the present disclosure, the motorized vehicle shown in a front closed position and a rear closed position.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps may be different in various embodiments, including where certain steps may be simultaneously performed, unless expressly stated otherwise. “A” and “an” as used herein indicate “at least one” of the item is present; a plurality of such items may be present, when possible. Except where otherwise expressly indicated, all numerical quantities in this description are to be understood as modified by the word “about” and all geometric and spatial descriptors are to be understood as modified by the word “substantially” in describing the broadest scope of the technology. “About” when applied to numerical values indicates that the calculation or the measurement allows some slight imprecision in the value (with some approach to exactness in the value; approximately or reasonably close to the value; nearly). If, for some reason, the imprecision provided by “about” and/or “substantially” is not otherwise understood in the art with this ordinary meaning, then “about” and/or “substantially” as used herein indicates at least variations that may arise from ordinary methods of measuring or using such parameters.

Although the open-ended term “comprising,” as a synonym of non-restrictive terms such as including, containing, or having, is used herein to describe and claim embodiments of the present technology, embodiments may alternatively be described using more limiting terms such as “consisting of” or “consisting essentially of” Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

When an element or layer is referred to as being “on,” “engaged to,” “coupled to,” or “coupled to” another element or layer, it may be directly on, engaged, coupled or coupled to the other element or layer, or intervening elements or layers may be present. In contrast, when an element is referred to as being “directly on,” “directly engaged to,” “directly coupled to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” may encompass both an orientation of above and below. The device may be otherwise oriented (rotated 90 degrees or at other orientations) and the spatially relative descriptors used herein interpreted accordingly.

As shown in FIGS. 1-5, the present disclosure includes a motorized vehicle 100 having a chassis 102 configured to support a front portion 104 disposed at a first end 106 of the chassis 102 and a rear portion 108 disposed at a second end 110 of the chassis 102. The front portion 104 may be configured to be selectively moved relative to one or both of the rear portion 108 and the chassis 102 between a front closed position 112 (shown in FIG. 2) and a front opened position 114 (shown in FIG. 4). The rear portion 108 may be configured to be selectively moved relative to one or both of the front portion 104 and the chassis 102 between a rear closed position 113 (shown in FIG. 2) and a rear opened position 115 (shown in FIGS. 3 and 4). The front closed position 112 and the rear closed position 113 permits for a safe operation of the motorized vehicle 100 containing one or both of a driver 116 and a passenger 118, and the front opened position 114 and the rear opened position 115 permits for an easy exit or entry of the driver 116 and the passenger 118 when the motorized vehicle 100 is not in use. The motorized vehicle 100 may be formed using any material or combination of materials such as steel, aluminum, plastic, composite, glass, rubber, and nylon, as non-limiting examples, as determined by one of skill in the art.

In certain embodiments, a driver seat 120 may be permanently or removably coupled to a base 122 of the chassis 102 at the first end 106, and at least one passenger seat 124 may be permanently or removably coupled to the base 122 of the chassis 102 at the second end 110 of the chassis 102. The driver seat 120 may be configured to receive the driver 116 for operation of the motorized vehicle 100. In certain embodiments, the passenger seat 124 may be positioned directly behind the driver seat 120. Each of the driver seat

120 and the passenger seat 124 may be adjustable, removable, foldable, collapsible, and otherwise modifiable with respect to the chassis 102, the driver 116, and the passenger 118. Adjustments to the driver seat 120 and the passenger seat 124 may be made manually or automatically, according to various embodiments. A height of the driver seat 120 and the passenger seat 124 relative to the chassis 102 may be adjusted during entry and exit of the motorized vehicle 100.

The motorized vehicle 100 may include at least one vertical support 126 integral with or permanently or removably coupled to the chassis 102. In certain embodiments, the vertical support 126 may extend upwardly from the base 122 of the chassis 102 and be disposed centrally between the front portion 104 and the rear portion 108 of the motorized vehicle 100. Additional vertical supports 126, roll bars 128, and support frame components 130 configured to protect the driver 116 and the passenger 118 from injury may be integral with or permanently or removably attached to one or more of the chassis 102, the front portion 104, and the rear portion 108 of the motorized vehicle 100. Any suitable size, shape, and configuration for the vertical supports 126, roll bars 128, and support frame components 130, as well as any suitable coupling means, may be employed. In certain embodiments a driver seat belt (not shown) may be affixed to the vertical support 126 of the motorized vehicle 100. However, one of skill in the art may select any suitable location and configuration for any number of driver and passenger seatbelts (not shown). One or both of the front portion 104 and the rear portion 108 may be removably coupled to or flush with the vertical support 126 in the front closed position 112 and the rear closed position, respectively.

Figure 4:
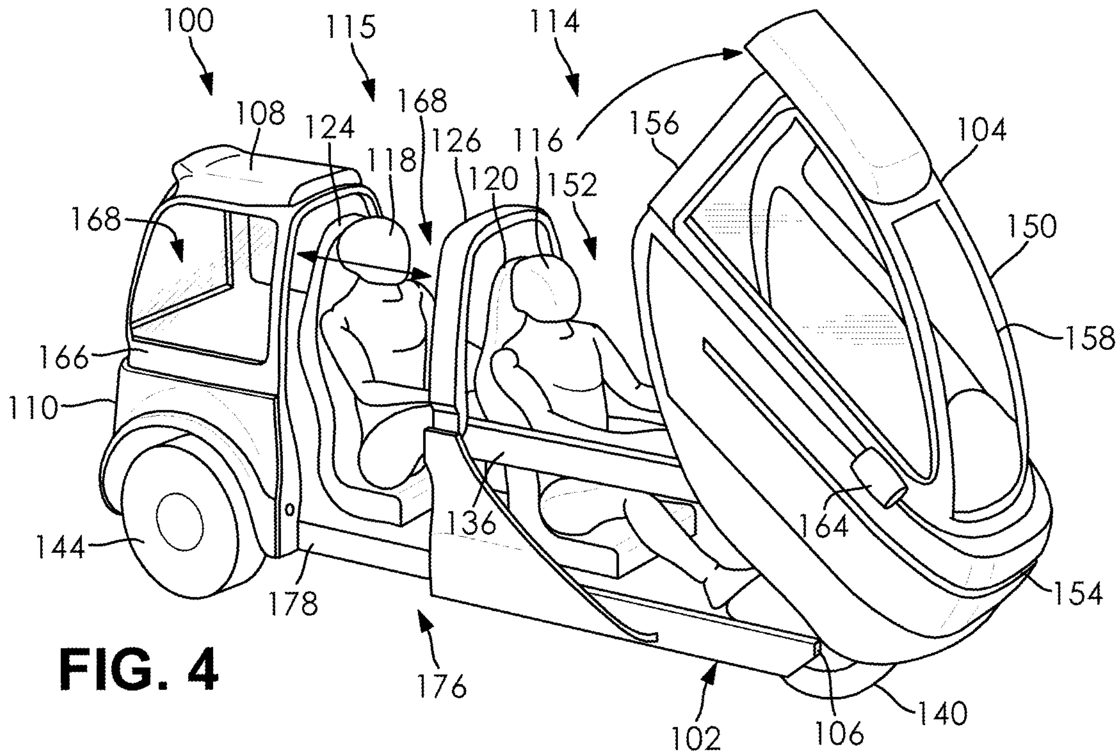
FIG. 4 is front perspective view of the motorized vehicle of FIG. 2 shown with the front portion and the rear portion each in an opened position.
Figure 5:
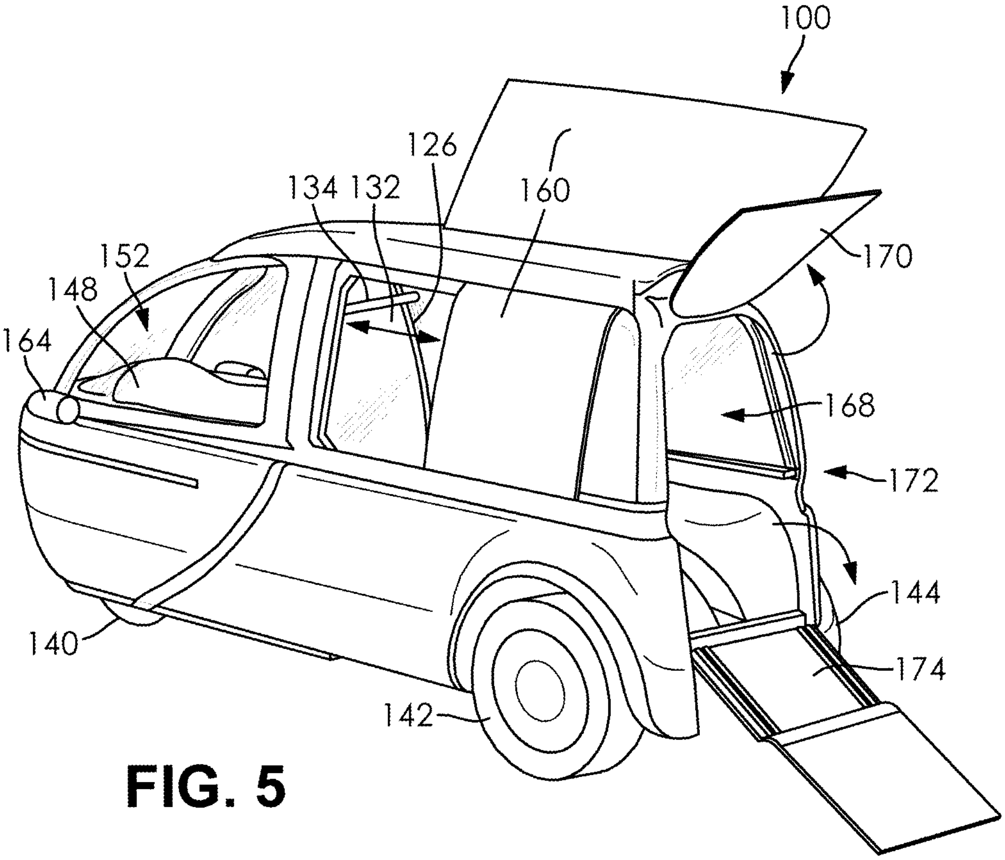
FIG. 5 is a rear perspective view of a motorized vehicle according to another embodiment of the present disclosure.

A wall 132, as shown for example in FIG. 5, may be integrally formed in or permanently or removably affixed to the vertical support 126 and adapted to prevent the passenger 118 from coming into contact with the driver 116. In certain embodiments, an adjustable window (not shown) may be formed in the vertical support 126 and adapted to allow the passenger 118 and the driver 116 to communicate, as needed. A grab handle 134 may be attached to the wall 132 and adapted for use by the passenger 118 when entering or exiting the motorized vehicle 100. Additional safety features such as guard rails 136, as shown in FIG. 4, may be integral with or coupled to one or more of the chassis 102, the front portion 104, and the rear portion 108 of the motorized vehicle 100.

In certain embodiments, the motorized vehicle 100 may have one or more axle assemblies (not shown) and one or more wheels 138 rotatingly coupled to one or more of the chassis 102, the front portion 104, and the rear portion 108 using any suitable coupling means. In a more particular embodiment, a front axle assembly (not shown) may be coupled to one or both of the front portion 104 and the chassis 102 at the first end 106 of the chassis 102 and configured to rotate a front wheel 140, and a rear axle assembly (not shown) may be coupled to one or both of the rear portion 108 and the chassis 102 at the second end 110 of the chassis 102 and configured to rotate a first rear wheel 142 and a second rear wheel 144. The first and second rear wheels 142, 144 may be adapted to contact a ground surface (not shown) and power a movement of the motorized vehicle 100 under operation by the driver 116. In certain alternative embodiments, the front wheel 140 or the front wheel 140 in combination with the first and second rear wheels 142, 144 may be adapted to contact the ground surface and power the movement of the motorized vehicle 100. A skilled artisan may include any suitable number of wheels 138 and axles in any desired configuration.

As non-limiting examples, one or more of the chassis 102, the front portion 104, and the rear portion 108 may also be integral with or permanently or removably coupled to one or more of an engine (not shown), an engine housing 146, a transmission system (not shown), a steering system 147, a braking system (not shown), a suspension system (not shown), a fuel system (not shown), an electrical system (not shown), a lighting system (not shown), an ignition system (not shown), one or more batteries (not shown), generators (not shown), and electric drive motors (not shown), a dashboard 148, cupholders (not shown), storage compartments (not shown), receptacles for liquids (not shown) such as washer fluid and oil, actuators (not shown), computer systems (not shown), displays and user interfaces (not shown), and any other suitable motor vehicle components necessary for safe and efficient operation of the motorized vehicle 100, as determined by one of skill in the art.

Figure 3:
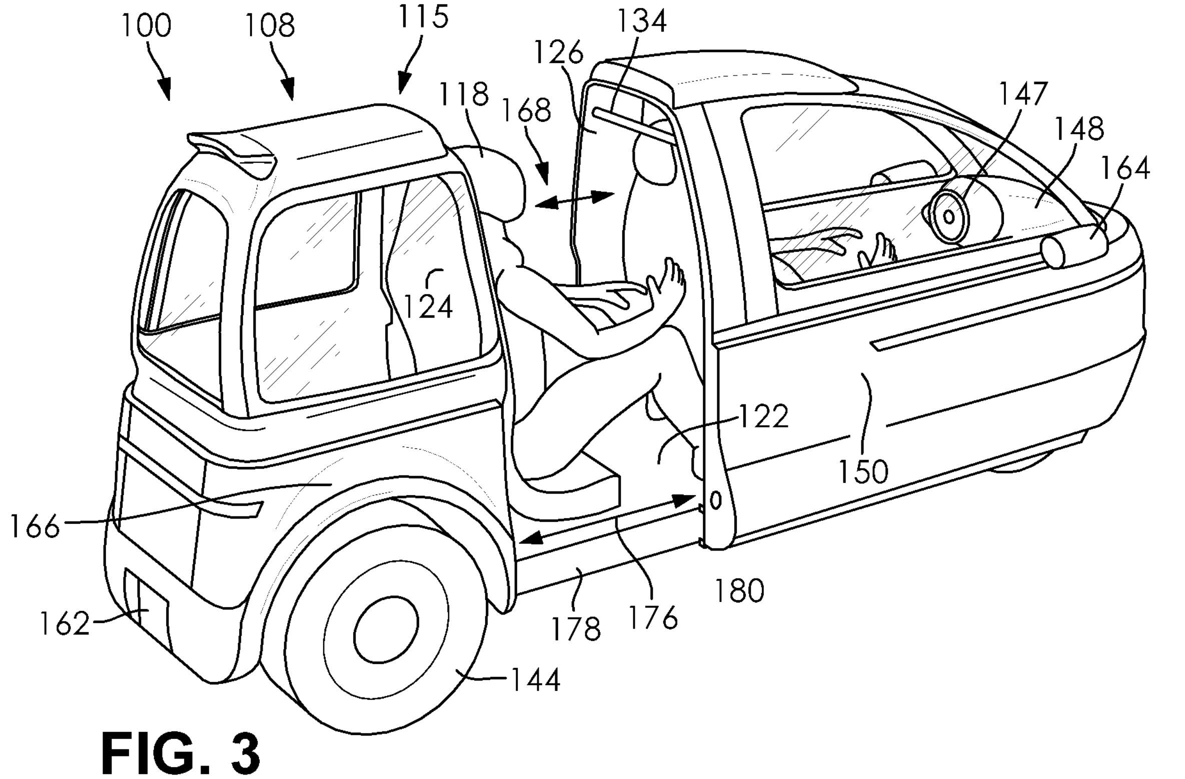
FIG. 3 is a rear perspective view of the motorized vehicle of FIG. 2 shown with the rear portion in an opened position.

With continued reference to FIGS. 1-5, the front portion 104 of the motorized vehicle 100 may include a first cover 150 and be configured to pivotably or slidingly engage with the first end 106 of the chassis 102. The driver seat 120 may be housed in a first cavity 152 formed when the front portion 104 is secured to the chassis 102 in the front closed position 112. As shown in FIG. 4, the front portion 104 may be adapted to pivot with respect to the chassis 102 between the front closed position 112 and the front opened position 114 to permit for the entry or exit of the driver 116. In certain more particular embodiments, a first end 154 of the front portion 104 may be pivotably coupled to the first end 106 of the chassis 102. A second end 156 of the front portion 104 positioned opposite the first end 154 of the front portion 104 may extend upwardly away from the chassis 102 when the front portion 104 is pivoted from the front closed position 112 to the front opened position 114, thereby allowing the driver 116 to enter and exit the motorized vehicle 100 as needed. One of ordinary skill in the art may select any suitable means for the entering and exiting the motor vehicle, as desired. As one non-limiting example, the front portion 104 may be adapted to slide forward with respect to one or both of the chassis 102 and the rear portion 108 to allow for entry and exit of the driver 116.

The front portion 104 may include any desirable motor vehicle components such as a front windshield 158, front windshield wipers, speakers, one or more side windows 160, a sunroof, vehicle identification placards, and mirrors 164, as non-limiting examples. The additional motor vehicle components may be integral with the front portion 104 or permanently or removably coupled to the front portion 104, and adjustments and actuating of the motor vehicle components may be done manually or automatically. In certain embodiments, the first cover 150 may be fabricated using a hard, fixed material that is permanently engaged with or coupled to the chassis 102. In alternative embodiments, the first cover 150 may be removable from the front portion 104, thereby exposing the vertical supports 126, roll bars 128, and support frame components 130. In certain embodiments, the first cover 150 may be fabricated using a durable fabric, such as nylon, as one non-limiting example, and may be adapted to be coupled to and removed from the front portion 104 by the driver 116, as desired. The front portion 104 may include a locking mechanism (not shown) adapted to secure the front portion 104 of the motorized vehicle 100 to the chassis 102 in the front closed position 112 when prompted by the driver 116 or during operation. In certain embodiments, the locking mechanism may secure the front portion 104 to one or more of the vertical support 126, the chassis 102, and the rear portion 108. A skilled artisan may employ any safety and luxury components commonly used in motorized vehicles, as desired.

The rear portion 108 may include a second cover 166 and be configured to slidingly or pivotably engage with the second end 110 of the chassis 102. The passenger seat 124 may be housed in a second cavity 168 formed when the rear portion 108 is secured to the chassis 102 in the rear closed position 113. As shown in FIGS. 3 and 4, the rear portion 108 may be slidingly engaged with one or more of the chassis 102 and the front portion 104 and adapted to move linearly with respect to one or both of the chassis 102 and the front portion 104 between the rear closed position 113 and the rear opened position 115 to permit for the entry and exit of the passenger 118. In certain embodiments, the rear portion 108 may be pivotably coupled to the second end 110 of the chassis 102 and adapted to pivot upwardly away from the base 122 of the chassis 102 to allow for the entry and exit of the passenger 118. One of ordinary skill in the art may select any suitable means for entering and exiting the motorized vehicle 100, as desired.

The rear portion 108 may include any desirable motor vehicle components such as a rear windshield 170, rear windshield wipers (not shown), speakers (not shown), side windows 160, storage compartments (not shown), a sunroof (not shown), a rear opening 172 used to enter, exit, or access the second cavity 168 of the rear portion 108, vehicle identification placards 162, and a ramp 174 adapted to extend outwardly from the rear opening 172 of the rear portion 108, as non-limiting examples. The additional motor vehicle components may be integral with the rear portion 108 or permanently or removably coupled to the rear portion 108, and adjustments and actuating of the motor vehicle components may be done manually or automatically, as determined by one of skill in the art. In certain embodiments, the second cover 166 may be fabricated using a hard, fixed material that is permanently engaged with or coupled to the chassis 102. In alternative embodiments, the second cover 166 may be removable from the rear portion 108, thereby exposing the vertical supports 126, roll bars 128, and support frame components 130. In certain embodiments, the second cover 166 may be fabricated using a durable fabric, such as nylon, as one non-limiting example, and may be adapted to be coupled to and removed from the rear portion 108 by the driver 116 or passenger 118, as desired. The rear portion 108 may include a locking mechanism (not shown) adapted to secure the rear portion 108 of the motorized vehicle 100 to the chassis 102 in the rear closed position 113 when prompted by the driver 116, the passenger 118, or during operation of the motorized vehicle 100. In certain embodiments, the locking mechanism may secure the rear portion 108 to one or both of the vertical support 126 and the chassis 102. A skilled artisan may employ any safety and luxury components commonly used in motorized vehicles, as desired.

In certain embodiments, one or more sliding mechanisms 176 may be integral with or coupled to one or more of the chassis 102, the front portion 104, and the rear portion 108 and adapted to enable linear movement of one or both of the front portion 104 and the rear portion 108 relative to one another and/or relative to the chassis 102. One of ordinary skill in the art may select any suitable means for slidably coupling one or both of the front portion 104 and the rear portion 108 to the chassis 102 and/or to one another, within the scope of the present disclosure.

In one non-limiting example, as shown in FIG. 3, the second end 110 of the chassis 102, including the rear portion 108, may be slidingly engaged with the first end 106 of the chassis 102, including the front portion 104. In certain more particular embodiments, one or more side rails 178 that are integral with or coupled to the second end 110 of the chassis 102 may be slidably disposed in one or more corresponding recesses (not shown) formed in the first end 106 of the chassis 102 or on one or more corresponding tracks 180 coupled to the first end 106 of the chassis 102. In an alternative embodiment (not shown), one or more side rails that are integral with or coupled to the first end 106 of the chassis 102 may be slidably disposed in or on one or more corresponding recesses or tracks that are integral with or coupled to the second end 110 of the chassis 102. In yet another non-limiting example (not shown), one of the first end 106 and the second end 110 of the chassis 102 may be telescopically and slidingly engaged with the other of the first end 106 and the second end 110 of the chassis 102. A manual or automatic locking mechanism (not shown) may secure the first and second ends 106, 110 of the chassis 102 to one another, the front and rear portions 104, 108 to the chassis 102, and the front and rear portions 104, 108 to one another, as determined by one of skill in the art.

In another non-limiting example, one or both of the front and rear portions 104, 108 may include one or more side doors (not shown) having rails, bars, or any other suitable sliding mechanisms slidingly engaged with tracks or other corresponding parts disposed on the chassis 102 and/or the front or rear portions 104, 108, thereby allowing linear movement of the one or more side doors with respect to one or more of the chassis 102, the front portion 104, and the rear portion 108. In yet another non-limiting example, a rear axle (not shown) may be affixed to the rear portion 108 and one or both of the rear portion 108 and the rear axle may be slidingly engaged with the chassis 102 using rails, tracks, or any other suitable sliding mechanism, as determined by one of skill in the art.

A skilled artisan may employ any suitable means for slidingly coupling one or both of the front portion 104 and the rear portion 108 to one another and/or to the chassis 102, as desired. In certain embodiments, the driver 116 or the passenger 118 may manually slide one or both of the front portion 104 and the rear portion 108 with respect to one another and/or the chassis 102 in order to enter and exit the vehicle using a door handle (not shown) or any other suitable mechanism. In certain embodiments, a rotation of the front wheel 140 and the braking of the first and second rear wheels 142, 144 may cause the motorized vehicle to move between the rear opened position 115 and the rear closed position 113. Alternatively, a rotation of one or both of the rear wheels 142, 144 and the braking of the front wheel 140 may cause the motorized vehicle to move between the rear opened position 115 and the rear closed position 113. A skilled artisan may also select other suitable means for moving the motorized vehicle 100 between the rear opened position 115 and the rear closed position 113.

In certain embodiments, a prime mover (not shown) such as an electric drive motor, an air cylinder, and a hydraulic cylinder, as non-limiting examples, may be used to slide one or both of the front portion 104 and the rear portion 108 with respect to one another and/or the chassis 102. The opening and closing of one or both of the front portion 104 and the rear portion 108 may also be accomplished using power from electric drive wheels, power from electric motors, hydraulics, pneumatics, or a system of cables and pulleys, racks and pinions, rails and tracks, or electromagnetic forces or springs, as determined by one of skill in the art. The motorized vehicle 100 may include an obstacle detection system (not shown) so that the front portion 104 and the rear portion 108 will not close on and injure the driver 116 or the passenger 118 during entry and exit.

In certain embodiments, the rear axle assembly (not shown) may be configured to be selectively moved between a retracted position (not shown) and an extended position (not shown) to maintain stability at various speeds. The retracted position may have a minimum width (not shown) between the first and second rear wheels 142, 144 that is less than a maximum width (not shown) between the first and second rear wheels 142, 144 in the extended position. Any suitable distances for the minimum width and the maximum width may be selected within the scope of the present disclosure, as desired.

The motorized vehicle 100 may include additional modular components (not shown) that may be added or removed to the motorized vehicle 100 by the driver 116 or the passenger 118. Additional modular components may include roll cages (not shown), roof racks (not shown), a tow hitch (not shown), and cargo boxes (not shown), as non-limiting examples. The motorized vehicle 100 may also have different body styles, according to various embodiments. As one non-limiting example, the motorized vehicle 100 may have an extended rear portion 108 having an increased length, as shown in FIG. 5, suitable for more than one passenger 118 or one passenger 118 and cargo, as desired.

In a most particular embodiment, the motorized vehicle 100 may have a predetermined dimension selected to provide a total length of the motorized vehicle 100 that may be less than about twenty-four hundred millimeters (2400 mm). In another most particular embodiment, a predetermined dimension selected to provide a total width of the motorized vehicle 100 may be less than about twelve hundred and eighty millimeters (1280 mm). A skilled artisan may select any suitable dimensions and configurations for the motorized vehicle 100, as desired.

Advantageously, the motorized vehicle 100 is safe, efficient, compact, practical, modular, easy to make and use, convenient to get in and out of, easy to park, capable of lane-sharing and lane-splitting, inexpensive to make and operate, and fun. The motorized vehicle 100 achieves safety and stability due to its unique construction and low center of gravity, and is narrow enough to share and split lanes in traffic jams, adding significantly to its value proposition. Additionally, the motorized vehicle 100 further offers protection from inclement weather, protection from injury during accidents, cargo capacity, and highway capable speeds combined with stability.

Advantageously, the motorized vehicle 100 is compact while maintaining an easy entry and exit for the driver 116 and the passenger 118 using the pivoting front portion 104 and the sliding mechanism 176 for the rear portion 108, in certain embodiments. The motorized vehicle 100 also makes it easy and safe for the driver 116 when the motorized vehicle 100 is used as a taxi because the driver 116 does not have to exit the motorized vehicle 100 for the passenger 118 to enter, and the driver 116 may remain safely in the first cavity 152 of the motorized vehicle 100 while the passenger 118 remains separated in the second cavity 168. The first and second cavities 152, 168 provide less physical and airborne contact, which may be desirable during times of disease and pandemic. Advantageously, in certain embodiments, the motorized vehicle 100 retains the width and the length of a motorcycle with the stability of a four-wheeled automobile.

Figure 6:
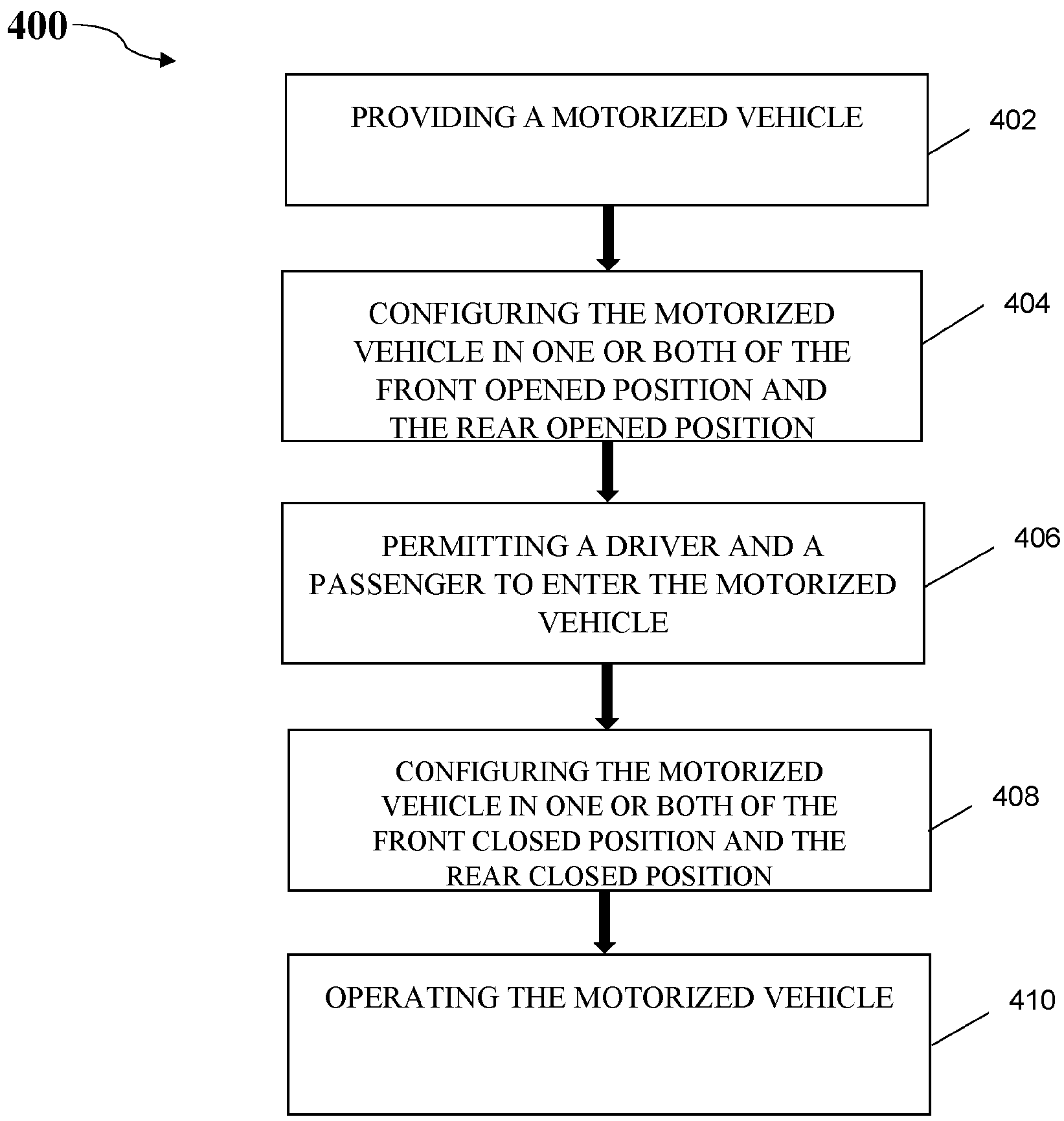
FIG. 6 is a method of using a motorized vehicle, according to an embodiment of the present disclosure.

With reference to FIG. 6, a method 400 for using the motorized vehicle 100 may include providing the motorized vehicle 100 with the chassis 102, the front portion 104, and the rear portion 108, as described hereinabove, in a first step 402. A second step 404 may include one or both of the driver 116 and the passenger 118 configuring the motorized vehicle 100 in one or both of the front opened position 114 and the rear opened position 115. Configuring the motorized vehicle 100 in one or both of the front opened position 114 and the rear opened position 115 may be accomplished using one or both of a manual or automatic mechanism. As one non-limiting example, configuring the motorized vehicle 100 in the front opened position 114 may include pivoting the front portion 104 with respect to the chassis 102 and sliding the rear portion 108 away from the front portion 104. A third step 406 may include permitting the driver 116 and the passenger 118 to enter the motorized vehicle 100. In a fourth step 408, one or both of the driver 116 and the passenger 118 may initiate configuration of the motorized vehicle 100 in one or both of the front closed position 112 and the rear closed position 113 using one or both of a manual and automatic mechanism. As one non-limiting example, configuring the motorized vehicle 100 in one or both of the front closed position 112 and the rear closed position 113 may include pivoting the front portion 104 toward the chassis 102 and sliding the rear portion 108 toward the front portion 104. In a fifth step 410, the driver 116 may operate the motorized vehicle 100, as desired.

It should be appreciated that additional steps may be included, as determined by one of skill in the art. As non-limiting examples, various steps relating to the setup of the motorized vehicle 100, as well as adjustments and customization of various components and safety features such as side windows 160, cargo space, the driver and passenger seats 120, 124, and the first and second covers 150, 166 may be included. The method 400 for using the motorized vehicle 100 may also include repeating or omitting various steps, as needed. The motorized vehicle 100 may be used by the driver 116 alone. Advantageously, the motorized vehicle 100 and the method 400 of using the motorized vehicle 100 may be utilized in a multitude of settings and may be customized by the driver 116 and the passenger 118, as needed.

Example embodiments are provided so that this disclosure will be through and fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, components and methods may be made within the scope of the present technology, with substantially similar results.

What is claimed is:

1. A motorized vehicle, comprising:

a chassis;

a front portion disposed at a first end of the chassis, the front portion including a support frame, a first cover coupled to the support frame, a front windshield integral with the front portion, and at least one side window integral with the front portion, the front portion and the first end of the chassis defining a first cavity having a driver seat disposed therein; and a rear portion disposed at a second end of the chassis;

wherein a first end of the front portion is pivotably coupled to the first end of the chassis, and the front portion is configured to pivot as a unified assembly between a front closed position and a front opened position, a second end of the front portion opposite the first end extending upwardly away from the chassis in the front opened position, thereby permitting the driver to enter and exit the first cavity;

and wherein the rear portion is configured to be selectively moved between a rear closed position and a rear opened position relative to at least one of the front portion and the chassis.

2. The motorized vehicle of claim 1, wherein the rear portion and the second end of the chassis define a second cavity and a passenger seat is disposed in the second cavity.

3. The motorized vehicle of claim 1, wherein a vertical support is disposed on the chassis between the front portion and the rear portion.

4. The motorized vehicle of claim 3, wherein a second end of the front portion is removably coupled to one or more of the chassis, the rear portion, and the vertical support in the front closed position.

5. The motorized vehicle of claim 3, wherein the rear portion has a first end adjacent the vertical support and the rear portion is slidingly engaged with one or more of the chassis, the vertical support, and the front portion.

6. The motorized vehicle of claim 5, wherein the first end of the rear portion is removably coupled to one or more of the chassis, the front portion, and the vertical support in the rear closed position.

7. The motorized vehicle of claim 1, wherein a sliding mechanism configured to selectively move the rear portion between the rear closed position and the rear opened position includes at least one rail and at least one track.

8. The motorized vehicle of claim 7, wherein the at least one rail is coupled to the rear portion and the at least one track is disposed on the chassis.

9. The motorized vehicle of claim 7, wherein the first end of the chassis includes the at least one track and the second end of the chassis includes the at least one rail, and the first end of the chassis and the second end of the chassis are slidingly engaged with one another.

10. The motorized vehicle of claim 3, wherein the vertical support includes a wall configured to separate the front portion from the rear portion.

11. The motorized vehicle of claim 1, wherein a front axle assembly is coupled to one or both of the front portion and the chassis at the first end of the chassis and configured to rotate a front wheel, and a rear axle assembly is coupled to one or both of the rear portion and the chassis at the second end of the chassis and configured to rotate a first rear wheel and a second rear wheel.

12. The motorized vehicle of claim 11, wherein a rotation of the first rear wheel and the second rear wheel and a braking of the front wheel causes the rear portion to move between the rear closed position and the rear opened position.

13. The motorized vehicle of claim 1, wherein the motorized vehicle has a first predetermined dimension selected to provide a total length of the motorized vehicle that is less than about twenty-four hundred millimeters, and a second predetermined dimension selected to provide a total width of the motorized vehicle that is less than about twelve hundred and eighty millimeters.

14. A motorized vehicle, comprising:

a chassis;

a front portion disposed at a first end of the chassis, the front portion including a support frame, a first cover coupled to the support frame, a front windshield integral with the front portion, and at least one side window integral with the front portion, the front portion and the first end of the chassis defining a first cavity, the first cavity having a driver seat; and a rear portion disposed at a second end of the chassis, the rear portion and the second end of the chassis defining a second cavity, the second cavity having a passenger seat;

wherein a first end of the front portion is pivotably coupled to the first end of the chassis, and the front portion is configured to pivot as a unified assembly between a front closed position and a front opened position, a second end of the front portion opposite the first end extending upwardly away from the chassis in the front opened position, thereby permitting the driver to enter and exit the first cavity; and wherein the rear portion is slidingly engaged with the first end of the chassis and is configured to be selectively moved between a rear closed position and a rear opened position relative to at least one of the first end of the chassis and the front portion using a sliding mechanism.

15. The motorized vehicle of claim 14, wherein the sliding mechanism includes at least one rail and at least one track.

16. The motorized vehicle of claim 14, wherein a front axle assembly is coupled to one or both of the front portion and the chassis at the first end of the chassis and configured to rotate a front wheel, and a rear axle assembly is coupled to one or both of the rear portion and the chassis at the second end of the chassis and configured to rotate a first rear wheel and a second rear wheel.

17. The motorized vehicle of claim 16, wherein a rotation of the first rear wheel and the second rear wheel and a braking of the front wheel causes the rear portion to move between the rear closed position and the rear opened position.

18. A method of using a motorized vehicle, comprising:

providing a motorized vehicle including a chassis, a front portion disposed at a first end of the chassis, the front portion including a support frame, a first cover coupled to the support frame, a front windshield integral with the front portion, and at least one side window integral with the front portion, the front portion and the first end of the chassis defining a first cavity, the first cavity having a driver seat and a rear portion disposed at a second end of the chassis, wherein the front portion is configured to be selectively moved between a front closed position and a front opened position relative to at least one of the rear portion and the chassis, and the rear portion is configured to be selectively moved between a rear closed position and a rear opened position relative to at least one of the front portion and the chassis;

configuring the motorized vehicle in one or both of the front opened position and the rear opened position;

permitting one or both of a driver and a passenger to enter the motorized vehicle;

configuring the motorized vehicle in one or both of the front closed position and the rear closed position; and operating the motorized vehicle.

* * * * *